United States Patent Office 3,320,570
Patented May 16, 1967

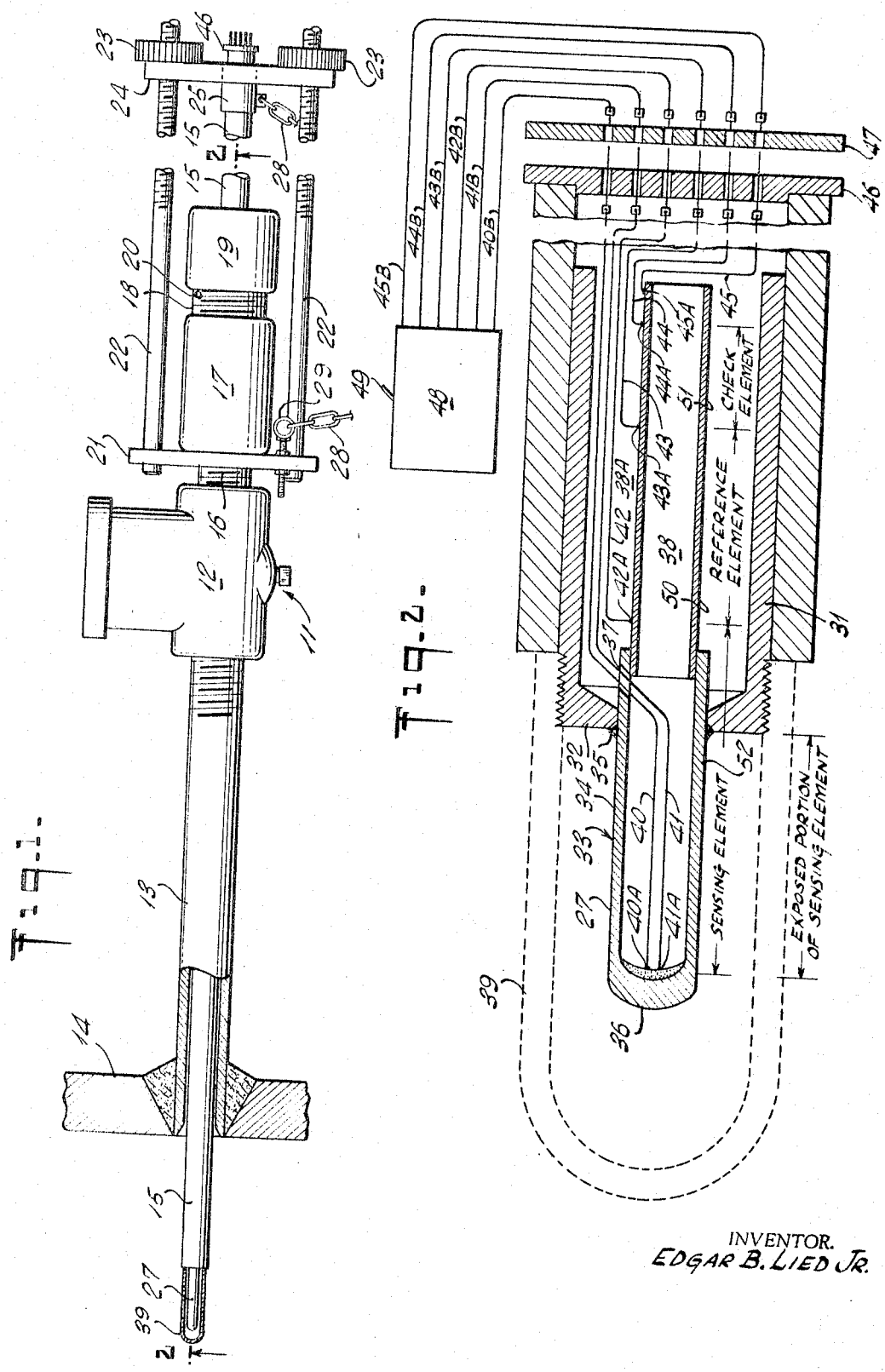

3,320,570
TEST ELEMENT FOR MEASURING THE DETERIORATION EFFECT OF FLUIDS
Edgar B. Lied, Jr., Sayreville, N.J., assignor to Encoa Corporation, Fanwood, N.J., a corporation of New Jersey
Filed May 20, 1963, Ser. No. 281,527
8 Claims. (Cl. 338—13)

This invention relates to probe test apparatus and, more particularly, to probe test apparatus adapted for use in measuring the corrosive or erosive effect of fluids.

Electrical resistance methods of corrosion monitoring in refinery equipment are now in extensive use. This manner of corrosion monitoring generally includes test apparatus which is positioned at various selected locations throughout conduits in refining processes that normally involve high temperature and pressure environments. Corrosive fluids within these conduits are observed at locations of the test apparatus. Usually a test element or sample insert of predetermined material construction is placed within the process conduit by means of a suitable valved housing connection. The test sample is electrically connected to an electrical resistance measuring instrument such as a Wheatstone bridge, and is often formed with a loop of wire at its extremity for placement in the fluid path. The corrosive attack upon the wire is thus reflected when its electrical resistivity is measured. The effectiveness of chemical corrosion inhibitors and the like, can be evaluated when they are added to the process. In this arrangement the rearward portion of the insert is normally provided with a reference element which must be sealed from attack by the corrosive fluid. Generally there is necessarily provided a double seal, one for each of the ends of the wire loop. Also, the rearward portion of the insert is normally so partitioned off from the forward extremity that differences in their respective temperature conditions preclude attaining results of maximum accuracy. When the wire loop is no longer useful, the entire insert is necessarily replaced.

One of the objects of the invention is to provide a test element having an improved seal means so as to substantially minimize the chance of test fluid leakage within the rearward portion of the element.

Another object of the invention is to provide a test element having substantially the same operative temperature conditions throughout its effective longitudinal surface, thereby rendering test results of maximum accuracy.

A further object of the invention is to provide a test element and an electrical resistance measuring instrument arrangement which will detect fluid leakage as a result of pitting without additional equipment.

Another object of the invention is to provide test apparatus having a sensing element which can be simply replaced by a similar element or that of another material after it has served its useful purpose.

A still further object of the invention is to provide a test element which is arranged to receive a like incident of cathodic or anodic protection as that which may be received on the internal surfaces of adjacent equipment, thereby rendering the maximum of exact condition comparison.

Another object of the invention is to provide an electrical conductor test element in which the effect of magnetic forces is substantially eliminated.

In one aspect of the invention the test element includes a support member for insertion through a valved passage, a tubular sensing element having a closed front extremity and a side wall portion mounted within the support member, and seal means between the tubular element and support member. A lateral passage through the side wall rearwardly of the seal means communicatively connects with a longitudinal passage extending exteriorly of the tubular element and within the support member. Contact means, carried by the interior surface of the sensing element at the front extremity and also within the longitudinal passage adjacent the rearward portion of the tubular element, enable electrical connection to an electrical resistance measuring instrument.

In another aspect of the invention an effective seal between the tubular element and support member is provided by a single metal-to-metal seal means.

In a further aspect of the invention the test element includes exposed sensing means, protected reference means, and means for measuring the relative electrical resistivity of the sensing and reference means when their corresponding temperature conditions are substantially the same.

In another aspect of the invention the provision of protected check means enables electrical resistivity measurement of the reference means relative to that of either the sensing means or the check means.

These and other objects and advantages of the invention will appear from the following description, reference being made to the drawings in which:

FIG. 1 is a side elevational view partially broken away of apparatus housing a test probe body constructed in accordance with the present invention; and FIG. 2 is an enlarged sectional view of the probe body taken substantially along line 2—2 of FIG. 1, and includes a schematic electrical connecting means to utilize a measuring instrument.

The housing apparatus generally shown at 11 (FIG. 1) preferably includes a gate valve 12 having a forward opening threadedly connected to one end of a tubular member 13, the latter having its other end welded or otherwise sealingly secured within an appropriate opening in a side wall 14 of a vessel carrying fluids whose deteriorable effect, corrosive or erosive, is to be measured. Supporting structure for a probe body 15 preferably is employed rearwardly of the valve. One end 16 of a packing gland body 17 is threadedly connected to the rearward opening in the gate valve, the other end 18 being externally threaded to receive an internally threaded packing gland nut 19 which retains appropriate packing means within a suitable internal recess within the body end 18. An internal passageway through tube 13, open condition of valve 12, and the entire packing gland assembly is of predetermined dimensions so as to receive the probe body 15. The packing body end 18 and packing therewithin preferably contain an appropriate fluid bleeding means 20, a common obvious expediency. The one end 16 of the packing body carries a stationary flange 21 in which are threadedly mounted a plurality of elongated take-up rods 22. The rearward portion of the rods 22 are threaded for a considerable length to carry knurled retaining nuts 23. A movable carriage or flange 24, having a hub portion 25 removably secured to the rearward portion of the probe body 15, is appropriately apertured for longitudinal movement with the body 15 along rods 22. The adjustable nuts 23 can be moved between predetermined positions so as to retain in a test position (FIG. 1), the exposed portion 27 of the test element projecting from the forward end of the body 15, and to serve as a stop means at a retracted position for the body when it is withdrawn from its test position. Preferably, safety chain means 28 also interconnect the hub portion on the movable flange and an adjustable eyebolt 29 on the stationary flange to assure that by proper adjustment the test element exposed portion 27 will have a predetermined withdrawn position, rearward of valve 12 for operation thereof and sufficiently forward of bleeding means 20. This will enable the valve 12 to be closed before fluid can escape through opening 20.

Preferably, the probe body 15 is of metallic tubular construction and the forward portion of its inner wall with a silver soldered connection rigidly and sealingly supports the mating outer surface of an end plug 31 (FIG. 2). The end plug is also formed as a metal tube having a forwardly oriented base portion 32. Mounted within a central opening in the base portion 32 is a precisely constructed test element shown generally at 33.

The test element 33 includes an accurately constructed tubular member 34 of predetermined dimensions, particularly the cross-sectional area of its side walls. Tubular member 34 is constructed of the same type of metallic material as the side wall 14 of the fluid vessel or adjacent critical metallic elements therewithin. Tube 34 is secured within the central opening in the base portion 32 by a single metal-to-metal annular seal 35 such that an exposed tubular portion 27 of predetermined length extends forwardly of the seal means 35 ready for immersion in the fluid carried by the vessel. The forward end or tip 36 of the tubular member 34 is closed and a side wall portion of the tubular member has a lateral passage 37 therethrough located rearwardly of the end plug base portion 32.

Preferably, the open rearward end of tubular member 34 rigidly supports a second tubular member 38 which is formed of thin light-walled tubing of smaller diametric dimensions. By forming the test element 33 of strong, small diameter tubing, its support structure 31, 15, normally designed to properly fit within existing conduit, valve and packing gland apparatus, may be sufficiently altered to fit similar newly constructed and less costly apparatus of much small dimensions.

In the construction of test element 33, a pair of electrical wires 40, 41 are passed through opening 37 and their one end portions are connected to the interior surface of tip 36 by immersion in a pool of solder deposited so as to form respective contacts 40A, 41A. End portions of wires 42, 43, 44, 45 are similarly connected at predetermined locations on the outer surface of tube 38 to form respective contacts 42A, 43A, 44A, 45A. Tubes 34 and 38 are then connected prior to being affixed to end plug 31. The forward outer surface of end plug 31 is preferably threaded so as to support a removable shield element 39. The respective other end portions of the electrical wires are secured at predetermined mountings upon an electrical connector 46 removably secured to the rearward end of probe body 15. A mating electrical connector 47 is appropriately wired to an electrical resistance measuring instrument 48 such as a Wheatstone bridge having potentiometer means capable of indicating relative resistance values of predetermined portions of the test element 33. The instrument 48 is provided with suitable switch means 49 for selectively energizing alternative circuits respectively containing predetermined portions of the test element 33 when the latter is energized by an electrical supply circuit which includes respective power in and out lines 40B, 45B. The respective lines 41B, 42B, 43B, 44B, as controlled by double-acting switch means 49, serve to establish alternative circuits. In one circuit, the potentiometer means is connected via lines 42, 43 with a reference element portion 50 of the test element, and via lines 43, 44 with a check element portion 51 to indicate relative resistance values of the respective portions 50, 51. So long as the probe interior remains sealed or protected from corrosive or deteriorable attack by the test fluid, the predetermined relative resistance values of portions 50, 51 will remain constant. The second circuit connects the potentiometer means via lines 42, 43 with the reference element portion 50, and via lines 41, 42 with a sensing element portion 52 of the test element to indicate relative resistance values of the respective portions 50, 52. As the corrosive test fluid attacks the exposed side wall portions of the sensing element 52, the rate of corrosive fluid effect over given periods of time upon the sample sensing element can be determined. The effect of inhibitors or other media that may be added to the fluid may likewise be determined.

It should be noted that the longitudinal passage 38A, surrounding tube 38 and in which the bulk of the internal wiring is located, allows the interior of tube 38 to be free from wiring. As a result, electro-magnetic forces are substantially precluded from adversely affecting the sensitivity of electrical resistance readings taken along the electrical conductor 38.

Under test conditions, the reference element 50 and sensing element 52 are subjected to substantially the same temperature conditions, thereby rendering result indications having maximum accuracy.

By providing metal-to-metal seal means 35 between the metallic test element 33 and metallic supporting structure 31, 15, the exposed portion 27 may be grounded to surrounding equipment and thus be conditioned for anodic or cathodic protection similarly to the interior surfaces of the fluid vessel or adjacent critical metallic means therewithin.

It is intended that modifications may be made without departing from the spirit of the invention as defined in the appended claims.

I claim:

1. A test element for use in measuring the deterioration effect of fluids, comprising a support member adapted for insertion through a passage leading into a fluid vessel, a tubular sensing element having a portion of its side wall mounted within said support member and having a closed front extremity, seal means between said tubular element and said support member, said sensing element having contact means, including a plurality of lead wires connected thereto, on the interior surface of said front extremity, said tubular element having a rearward extension, and additional contact means carried by at least one of said rearward extension and said tubular element, substantially rearward of said contact means so constructed and arranged that each of said contact means may be electrically connected to an electrical resistance measuring instrument.

2. A test element in accordance with claim 1 wherein said seal means is a single seal.

3. The test element of claim 2 in which said seal means is a metal-to-metal seal, so constructed and arranged that said tubular element may be grounded to surrounding equipment.

4. A test element in accordance with claim 1 wherein said sensing element sidewall has a lateral passage therethrough rearwardly of said seal means, a longitudinal passage within said support member and extending exteriorly of at least one of said tubular element and said extension and in communication with said lateral passage, and said additional contact means positioned within said longitudinal passage.

5. The structure of claim 4 wherein each of said contact means has connected thereto one end of a corresponding electrical wire, the other ends of the wires being available for connection to said resistance measuring instrument.

6. The structure of claim 1 in which each of said contact means has connected thereto one end of a corresponding electrical wire, the other ends of the wires being available for connection to said resistance measuring instrument.

7. The structure of claim 1 wherein said additional contact means includes a plurality of contacts longitudinally spaced along a reference portion on at least one of said extension and said tubular element.

8. The structure of claim 1 wherein said additional contact means includes a plurality of contacts longitudinally spaced along reference and check portions on at least one of said extension and said tubular element.

References Cited by the Examiner

UNITED STATES PATENTS

| | | | |
|---|---|---|---|
| 2,763,534 | 9/1956 | Campbell | 324—71 |
| 2,878,354 | 3/1959 | Ellison | 338—13 |
| 2,991,439 | 7/1961 | Marsh | 338—13 |
| 2,994,219 | 8/1961 | Schaschl | 324—71 |
| 3,004,232 | 10/1961 | Schaschl | 338—13 |
| 3,008,085 | 11/1961 | Dravnieks | 324—71 |
| 3,067,386 | 12/1962 | Freedman | 324—71 |
| 3,153,217 | 10/1964 | Cramer et al. | 324—71 |
| 3,156,887 | 11/1964 | Weikal | 324—71 |
| 3,197,724 | 7/1965 | Marsh | 338—13 |
| 3,222,920 | 12/1965 | Marsh | 338—13 |

RICHARD M. WOOD, *Primary Examiner.*

WALTER L. CARLSON, *Examiner.*

C. F. ROBERTS, W. D. BROOKS, *Assistant Examiners.*